March 31, 1964  H. HILFIKER  3,126,882
SET OF HEAT ACCUMULATING FOOD WARMING PLATES
AND HEATING MEANS THEREFOR
Filed Oct. 18, 1961

Hans Hilfiker,
Inventor
By Wenderoth, Lind & Ponack
Attorneys 3,126,882
SET OF HEAT ACCUMULATING FOOD WARMING PLATES AND HEATING MEANS THEREFOR
Hans Hilfiker, Kilchberg, Zurich, Switzerland, assignor to "Therma" A.G., Schwanden, Switzerland
Filed Oct. 18, 1961, Ser. No. 145,861
Claims priority, application Switzerland Oct. 20, 1960
3 Claims. (Cl. 126—246)

This invention relates to heat accumulating food warming plates and to means for heating a set of such plates. It is customary in restaurants and at home during meals to place the food on a food warming plate having a limited capacity of heat accumulation in order to substantially slow down the cooling of the food.

Devices for electrically heating a set of food warming plates are known. Such devices comprise a casing or cabinet provided with a series of superposed openings for insertion of the aluminum warming plates. The feet of the inserted plates are projecting from opposite sides of the cabinet. The transmission of heat to the warming plates is principally effected by convection. The drawbacks of these known devices are the required long period of heating for bringing the plates to the required temperature, the great heat losses by the casing and by the openings therein when some of the plates have been removed for use, the high consumption of current for accumulation of the required amount of heat, and the camparatively great dimensions of the device owing to the spacing of the plates required for transmission of heat by convection. A further inconvenience is the fact that a person needs both hands for removing the plates from the cabinet and carrying the plates and that the plates can only be removed from the cabinet at one side thereof.

It is an object of the invention to avoid the above mentioned drawbacks.

According to the invention, a set of heat accumulating food warming plates and heating means therefor comprises a hot plate and a series of food warming plates carried by said hot plate in superposed relationship, said food warming plates having a heat conducting heat accumulation body provided with top and bottom contact faces, the top contact face of one warming plate serving to support the next higher warming plate by its bottom contact face.

According to a further feature of the invention the food warming plates are provided with a marginal skirt portion extending along the circumference of the heat accumulating body and made of a material having poor heat conductive properties. The heat losses of the outer surfaces of the superposed warming plates are reduced owing to throttling of the heat convection by the outer marginal skirts. These skirts also have the function to center the superposed plates one with respect to the other.

The food warming plates and the hot plate will preferably be made of square shape so that the plates can be conveniently placed one on top of the other or removed from the staple from any side or in any direction.

Two or more food warming plates can be easily placed side by side on a table when a food dish of greater than normal size is to be kept warm.

A preferred embodiment of a heating device for a set of food warming plates is illustrated in the accompanying drawing.

Figure 1:
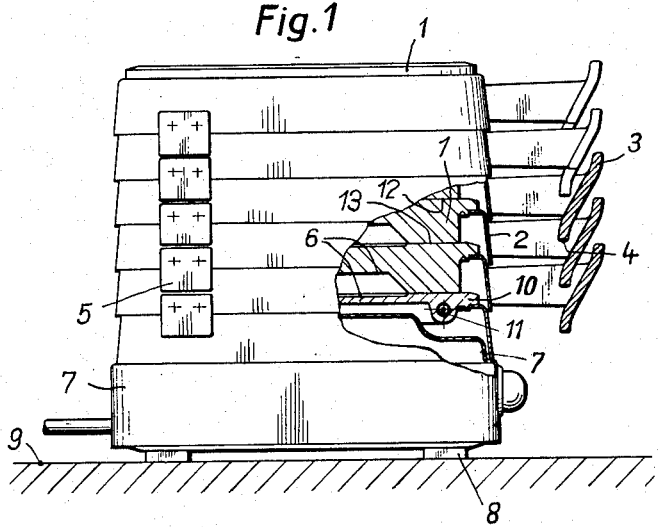
FIGURE 1 is a view in elevation, partly drawn in section, of a heating device with five superposed warming plates.
Figure 2:
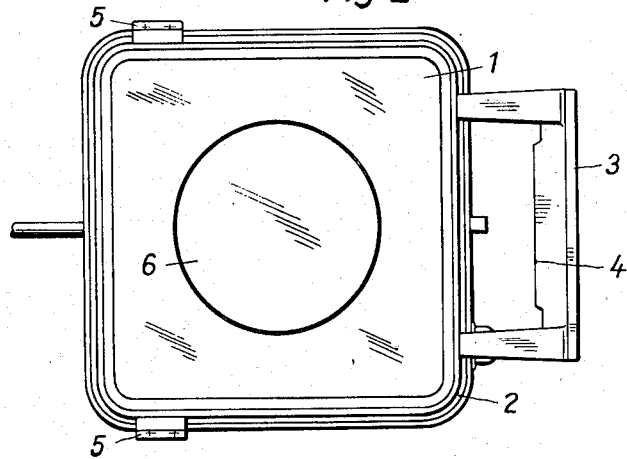
FIGURE 2 is a top plan view of the superposed plates.

Each food warming plate comprises a heat accumulating body 1 of generally square shape, and a marginal skirt portion 2 extending along the entire circumference of the body 1. A handle member 3 is fixed to one side of the skirt portion, and two plate supporting feet 5 are fixed to opposite sides, respectively, of the skirt portion. The heat accumulating body 1 is made of a good heat conducting material, as for example aluminum, while the skirt portion 2 consists of poor heat conductive material when compared with aluminum, as for example stainless steel.

Each heat accumulating body 1 is provided with an annular top contact face 12 and with an annular bottom contact face 13, the top contact face 12 of one plate serving to support the next higher plate by its bottom contact face. Both top and bottom faces of the heat accumulating body 1 are recessed as shown at 6 to provide for safe stacking of the plates and for efficient heat transfer between the accumulating bodies by uniform contact between the top contact face of one plate and the bottom contact face of the next lower plate. The lower end 4 of the handle 3 serves as third foot for supporting the warming plates on a table. The width of the handle in vertical direction is greater than the height of a warming plate, so that the handle can be firmly grasped by the hand and a plate easily removed from and placed on the staple of plates, whereby serving of meals in restaurants is facilitated, since the waiter can carry the warming plate by one hand and at the same time the dish to be served by the other hand.

An electric heating device 7 having feet 8 is supported on a pedestal 9. The upper portion of the heating device is formed by a hot plate 10 having built-in electric heating elements 11. The heating device 7 further comprises the usual electrical components, as current supply connections, switch, temperature regulator, signal lamp and others.

The operation of the described warming plate staple heater is as follows. When the current supply is switched on, the hot plate 10 heats up and the generated heat flows rapidly through the contact face 13 of the lowermost accumulating body 1 and heats this latter; from the lowermost body 1 the heat is transferred by its upper contact face 12 and the lower contact face 13 of the next higher body 1 to this latter, and so on until the top accumulating body is heated. The transfer of heat through the whole staple is quickly effected, since a good contact of the different contact faces is assisted by the weight of the staple. The temperature regulator controls the current supply and operates to maintain the desired constant temperature. Any desired number of food warming plates can be stacked on the heating device 7.

Instead of using electric current as heat producer, the heating device could be provided with gas burners.

I claim:
1. A food warming device comprising a heating device having a heat plate thereon and heater means under said heat plate for heating said heat plate, and a plurality of identical imperforate food warming plates each having a heat accumulation body with a top face and a bottom face, each top face having a shape corresponding to and being adapted to contact the bottom face of the heat accumulaton body next above it and each bottom face having a shape corresponding to and being adapted to contact the top face of the heat accumulation body next below it, at least one of the said faces of said heat accumulating bodies having a dish receiving recess therein which is surrounded by the said one face, said warming plates being stackable with the bottom face of the lowermost warming plate directly on the heat plate of said heating device and the respective top and bottom faces of the stacked warming plates in direct contact for transferring heat directly from each heat accumulation body to the next heat accumulation body by conduction.

2. A food warming device as claimed in claim 1 in which each warming plate has a skirt therearound secured to said heat accumulation body and being of a material with poorer thermal conductivity than the material of said heat accumulation body, said skirt having a portion depending from said heat accumulating body and having a lower edge cooperating with the upper part of the depending portion of the skirt on the warming plate next below to center the warming plate with respect to the warming plate next below and to help prevent heat loss from said heat accumulation bodies.

3. A food warming plate as claimed in claim 2 in which each warming plate has a handle on said skirt on one side of the warming plate and a foot on the skirt on each of the sides adjoining said one side of the warming plate, the vertical dimension of said handle being greater than the vertical dimension between the top and bottom faces of the heat accumulation body and said handle and feet extending below the lowermost edge of said skirt to form three points on which the warming plate rests when it is not stacked.

References Cited in the file of this patent

UNITED STATES PATENTS

| | | |
|---|---|---|
| 1,023,191 | Young | Apr. 16, 1912 |
| 1,077,507 | Ball | Nov. 4, 1913 |
| 1,238,746 | Cozel | Sept. 4, 1917 |
| 1,652,300 | Detwiler | Dec. 13, 1927 |
| 1,940,172 | Hybinette | Dec. 19, 1933 |
| 2,210,521 | Bemis | Aug. 6, 1940 |
| 2,582,735 | Alaj | Jan. 15, 1952 |
| 2,831,098 | Luscher | Apr. 15, 1958 |